United States Patent [19]

Kovar et al.

[11] Patent Number: 5,168,011

[45] Date of Patent: * Dec. 1, 1992

[54] INTERPENETRATED POLYMER FIBERS

[75] Inventors: Robert Kovar, Wrentham; Roland R. Wallis, Jr., Allston, both of Mass.

[73] Assignee: Foster Miller Inc., Waltham, Mass.

[*] Notice: The portion of the term of this patent subsequent to Jul. 4, 2006 has been disclaimed.

[21] Appl. No.: 365,847

[22] Filed: Jun. 14, 1989

Related U.S. Application Data

[60] Division of Ser. No. 64,746, Jun. 22, 1987, Pat. No. 4,845,150, which is a continuation-in-part of Ser. No. 780,648, Sep. 26, 1985, abandoned.

[51] Int. Cl.$^5$ .................. C08L 79/06; D02G 3/00; B32B 27/00
[52] U.S. Cl. .................. 428/373; 428/374; 428/375; 428/394; 428/524; 524/602; 524/606; 525/420; 525/423; 525/425; 525/432; 525/434; 525/436; 525/903
[58] Field of Search .............. 524/602, 606; 525/423, 525/425, 426, 432, 434, 436, 903, 535; 428/373, 374, 375, 394

[56] References Cited

U.S. PATENT DOCUMENTS

| | | | |
|---|---|---|---|
| 4,578,432 | 3/1986 | Tsai et al. | 525/432 |
| 4,631,318 | 12/1986 | Hwang et al. | 525/432 |
| 4,695,610 | 9/1987 | Egli et al. | 525/426 |
| 4,845,150 | 7/1989 | Kovak et al. | 525/434 |

Primary Examiner—Ana L. Carrillo
Attorney, Agent, or Firm—Ostrolenk, Faber, Gerb & Soffen

[57] ABSTRACT

This invention relates in general to the formation of fibers having a controlled molecular orientation prepared from rod-like extended chain aromatic-heterocyclic ordered polymers, and containing a binder in the micro-infrastructure. Such fibers have high tensile strength, modulus, and environmental resistance characteristics.

4 Claims, 1 Drawing Sheet

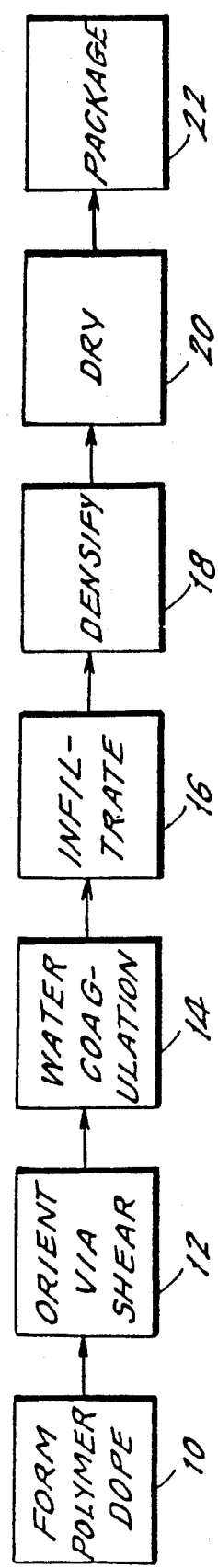
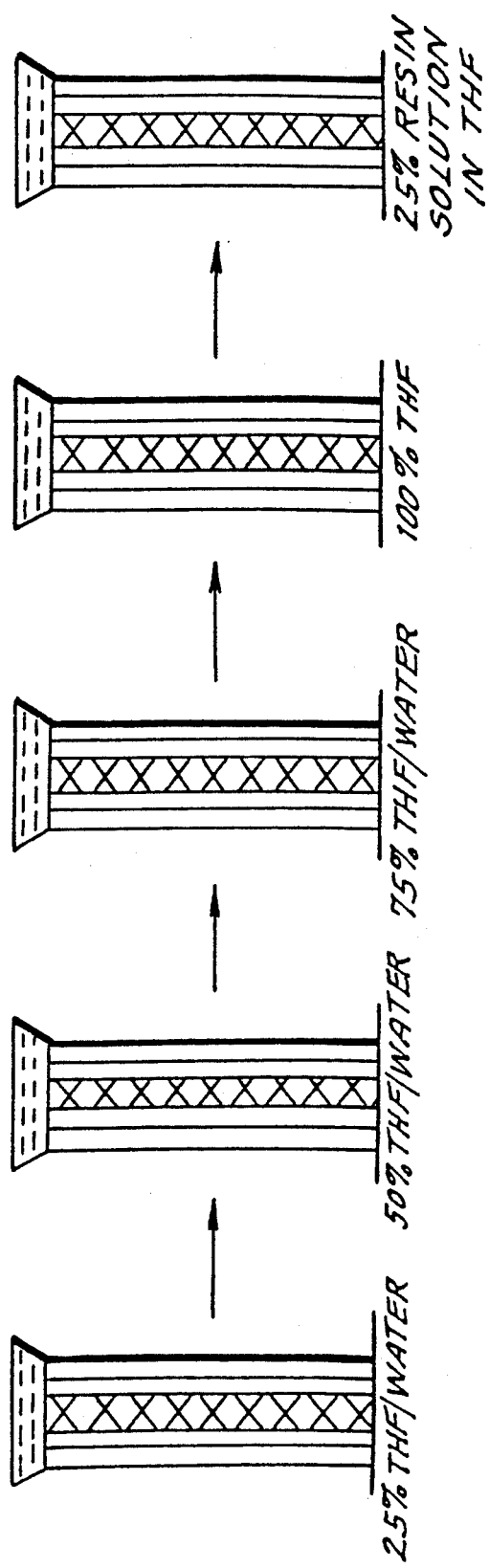

INTERPENETRATED POLYMER FIBERS

REFERENCE TO RELATED APPLICATION

This is a division of application Ser. No. 064,746, filed Jun. 22, 1987, now U.S. Pat. No. 4,845,150, which is a continuation-in-part of Ser. No. 780,648, filed Sep. 26, 1985, now abandoned.

BACKGROUND OF THE INVENTION

Ordered polymers are polymers having an "ordered" orientation in space i.e., linear, circular, star shaped, or the like, imposed thereon by the nature of the monomer units making up the polymer. Most ordered polymers possess a linear "order" due to the linear nature of the monomeric repeating units which comprise the polymeric chain. Linear ordered polymers are also known as "rod-like" polymers.

For example, U.S. Pat. No. 4,423,202 to Choe, discloses a process for the production of para-ordered, aromatic heterocyclic polymers having an average molecular weight in the range of from about 10,000 to 30,000.

U.S. Pat. No. 4,377,546 to Helminiak, discloses a process for the preparation of composite films prepared from para-ordered, rod-like, aromatic, heterocyclic polymers embedded in an amorphous heterocyclic system.

U.S. Pat. Nos. 4,323,493 and 4,321,357 to Keske et al., disclose melt prepared, ordered, linear, crystalline injection moldable polymers containing aliphatic, cycloaliphatic and araliphatic moieties.

U.S. Pat. No, 4,229,566 to Evers et al., describes para-ordered aromatic heterocyclic polymers characterized by the presence of diphenoxybenzene "swivel" sections in the polymer chain.

U.S. Pat. No. 4,207,407 to Helminiak et al., discloses composite films prepared from a para-ordered, rod-like aromatic heterocyclic polymer admixed with a flexible, coil-like amorphous heterocyclic polymer.

U.S. Pat. No. 4,108,835 to Arnold et al., describes para-ordered aromatic heterocyclic polymers containing pendant phenyl groups along the polymer chain backbone.

U.S. Pat. No. 4,051,108 to Helminiak et al., discloses a process for the preparation of films and coatings from para-ordered aromatic heterocyclic polymers.

Ordered polymer solutions in polyphosphoric acids (including PBT compositions) useful as a dope in the production of polymeric fibers and films are described in U.S. Pat. Nos. 4,533,692, 4,533,693 and 4,533,724 (to Wolfe et al.).

The disclosures of each of the above described patents are incorporated herein by reference.

Molecular orientation can be achieved during rotating die extrusion of thermoplastic polymers but the degree thereof is very low since random coil thermoplastic melts are not oriented to any great extent by shear, unless the melts are anisotropic. Minimal biaxial orientation of thermoplastics is obtained by blowing tubular films of the melt. Even then, the preferential molecular orientation in blown thermoplastic films is in the machine direction.

On the other hand, anisotropic dopes of ordered, rigid-rod polymers contain isolated bundles of oriented molecules suspended in solvent. Counter-rotating tubular extrusion of these polymers orients these crystallites in the direction of shear and stretching of biaxially-oriented tubular films of anisotropic dope by blowing further increases the degree of orientation in such materials. This is described in copending application Ser. No. 06/780,648, which is hereby incorporated by reference.

SUMMARY OF THE INVENTION

The present invention is directed to the production of films having heretofore unavailable strength characteristics. The starting materials useful herein include those lyotropic or thermotropic polymeric materials in which strain produces a material orientation in the microscale structure. The present invention is particularly applicable to dopes and like materials made from ordered polymers, or other rigid rod-like molecules. More specifically, the polymers are ordered rod-like extended chain aromatic heterocyclic polymers. The open microstructure of the polymers is infiltrated by a binder material so as to form an interpenetrated polymer.

The method of the present invention comprises first producing a certain microscale structural orientation within a polymer dope by imposing a strain thereon, precipitating the ordered structure, infiltrating the binder precursor into the solid ordered structure and then converting the precursor into the binder.

The present invention is especially useful in biaxially oriented films, coatings and like materials formed from ordered polymers. A preferred ordered polymer for use in the present invention is poly (para - phenylenebenzo bisthiazole), referred to herein as PBT, a compound having the structure:

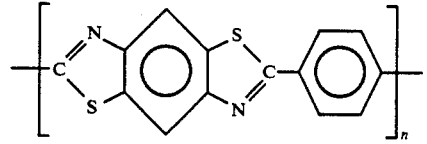

Biaxially oriented polymeric films of PBT are especially preferred embodiments of the present invention. These films posses unique properties including:

(a) high tensile strength (most preferably, greater than 100,000 psi ultimate tensile stress in one direction and not less than 40,000 psi ultimate tensile stress in any direction);

(b) high modulus (most preferably, greater than $5 \times 10^6$ psi tensile modulus in one direction and not less than $8 \times 10^5$ psi tensile modulus in any direction);

(c) controllable coefficient of thermal expansion (CTE) either negative, positive or zero in any particular direction in the plane of the film;

(d) low dielectric constant (most preferably, less than 3.0);

(e) low outgassing (most preferably, less than 0.1% weight loss in a vacuum at 125° C. for 24 hours);

(f) low moisture pickup (most preferably, less than 0.5% weight gain in water at 100° C. for 24 hours).

A second preferred ordered polymer is poly (para-phenylenebenzo bisoxazole).

The preferred films and methods of the present invention are described in greater detail in the accompanying drawings and in the detailed description of the invention which follow.

BRIEF DESCRIPTION OF THE DRAWINGS

FIG. 1 is a block diagram depicting a process of the present invention for the formation of biaxially oriented films from ordered polymers.

FIG. 2 shows solvent exchange and impregnation of the ordered film.

DETAILED DESCRIPTION OF THE PREFERRED EMBODIMENTS

The present invention is directed to the production of film having controlled anisotropic properties from ordered polymers. For convenience, the invention will be described in connection with the formation of a biaxially oriented film but it will be understood that the invention is not limited thereto.

When ordered polymers are subjected to a shear field, they become highly aligned in the direction of the applied field. By imparting to such polymers a preferred orientation, one obtains a material with a high tensile value which is the basis for producing fibers of high strength.

Similar orientation imparted in the machine direction during the production of ordered polymer films results in films having a very high tensile strength in the machine oriented direction but usually very poor physical properties in the transverse direction. In some cases, highly oriented polymer films will lose their film integrity by simply coming apart along the machine direction orientation.

As illustrated at 10 in FIG. 1, the first step comprises the formation of a polymer dope which preferably is an about 10 to 30 weight percent solution. Poly(phosphoric acid), referred to hereinafter as "PPA", is the preferred solvent. Other solvents such as methanesulfonic acid (MSA) or chlorosulfonic acid (CSA) may also be used. The solution is preferably degassed to prevent interference of entrapped gas within the polymer solution with the molecular orientation of the film. The dope formulation and formation are known.

The second step (12) comprises the orientation step. This may be accomplished by the use of any of extrusion means which induces shear flow, stretching, and like. The preferred extrusion means of the present invention include counter rotating tube dies, plates, or roller dies. It has been discovered that such extrusion means, preferably combined with subsequent stretching of the extrudate, may be employed to impart varying degrees of biaxial orientation to ordered polymers.

A third step (14) comprises coagulation of the polymeric solution to form a water swollen microporous film. A binder precursor is infiltrated into the film with or without solvent exchange in the next step (16) followed by a densification step (18). The penultimate step (20) is generically a drying and heat treatment step, and finally, at step (20), the product film is packaged.

Thus, briefly, the degassing step is conducted by apparatus which sends the homogenized dope to an extruder means whereupon shear is imparted to the dope. The dope is then blown using modified film blowing equipment and the blown tube enters a coagulation zone which comprises a water tank and may include additives useful in imparting specialized characteristics to the film. The coagulation zone acts to stabilize the molecular orientation imparted to the film by the extrusion and blowing processes. The water and/or additives in the bath spread into the microstructure of the film. Following the coagulation zone is an exchange bath where the acid used to prepare the polymer dope (PPA, MSA, CSA, etc.) is removed by repeated water washings. Following removal of the acid solvent from the film, the film can be exposed to other solutions that may include additives useful in imparting special characteristics to the film. Afterward, the film is dried under appropriate stress conditions in a drying oven. After drying, the film is packaged using conventional means.

Each of these general steps will be described further in the following description.

In one preferred embodiment, an extruder is used for the degassing of the PBT dope. After homogenization (as described in the Wolfe et al. patents), the dope is fed by means of a heated pressure pot to the inlet of a slow heated extruder which in turn feeds a positive displacement pump.

The positive displacement pump feeds a film die which has two counter rotating barrels whose purpose is to create a shear field through the cross section of the extruded dope composition. The shear field is at right angles to the axial shear field produced by forcing the dope axially through the annulus of the die. Counter rotating die members are necessary to prevent a screw-like rotation of the orientation and twist-off of the extrudate which occurs when only one member of the die is rotated. This combination of shear fields is necessary prior to the blowing operation in order to permit blowing of the tube without fracturing the extrudate, and hence, to produce material with integral biaxial film properties.

Another means of imparting shear stress to the polymer dope useful in the method of the present invention which comprises counter-rotating pressure plates. Polymer dope, such as PBT, is inserted between the plates, pressure is applied and the plates are rotated in opposite directions.

Another means is a laterally spreading die having open top and bottom contoured to fit in the convergence of two pinch rolls. The extrudate enters the die as a high and narrow flow, then undergoes progressive lateral and axial direct strains to emerge as a thin and wide strip. This strip then undergoes some further axial extension to become a film on one of the rolls, depending on the balance between roll surface velocity and supply pressure induced flow. Process variables include the proportions and internal shape of the die, the supply pressure, and the film tension.

Yet another apparatus is a counter-rotating tube die which comprises a rotatable cylindrical inner shaft having a smooth surface encased in an independently rotatable cylinder having a plurality of passageways therein. A space is provided between the shaft and the cylinder to allow for the introduction of polymer and to allow independent movement of shaft and cylinder which are rotated in opposite directions. Ordered polymer dope is fed through the passageways to the space between the shaft and cylinder. The polymeric mass strikes the shaft and is subjected to orientation forced by the opposing movement of cylinder and shaft.

Previous attempts to rotate only one cylinder of the tube die while maintaining the other in a stationary condition caused uncontrolled twisting and tearing of the dope extruding from the die.

Transverse shear, longitudinal flow shear, axial stretch, and radial expansion forces all interact to impart a partial biaxial orientation to the ordered polymer fed therethrough. Variations of the speed of the movement of the shaft and cylinders, as well as the flow rate, temperature, etc. effect the degree of orientation imparted to the ordered polymer feedstock. Additional orientation is imparted to the extruded film by virtue of the blowing processes, both following the extrusion and as a part of the heat treatment.

Upon exit from counter rotating means, the film is treated by a blowing operation where the film is expanded under internal pressure, further orienting the molecules throughout the film cross section. Control of the die RPM, extrusion rate, film windup rate, and degree of expansion results in a precisely aligned, blown PBT dope composition film. The top and bottom surfaces of the film are aligned at approximately equal but opposite angles to the machine direction. The processing variables of die speed (RPM), extrusion rate, and degree of film extension and expansion during the blowing operation, can be varied to achieve any desired degree of biaxial molecular orientation.

Biaxial shearing as well as biaxial direct stresses and strains can be imposed and controlled in this system. A useful combination of strain patterns is achieved where first a twisted nematic (cholesteric) orientation is promoted in the dies and then a uniform biaxial strain is promoted in the blow/stretch. The former, provides enough bi-directional strength for the latter, as well as near-order of layers, conducive to densification in the normal (thickness) direction. The biaxial strain can be symmetric or asymmetric. If this system is operated with low strain in the dies, then biaxial blow/stretch will promote biaxial nematic orientation rather than twisted nematic.

Control of the degree of molecular orientation results in attractive film properties. Blown dope compositions that have not been subjected to controlled shear fields prior to expansion do not have physical property balances anywhere approaching those of the films of the present invention. Furthermore, films extruded by the counter rotated die but not with the blowing process do not have good property balances. The combination of shear field extrusion followed by internal expansion and extension yields films with a useful property balance.

The extruded, sheared and blown film is quenched, both on the internal and external surfaces, by an aqueous coagulation bath or other controlled aqueous coagulant composition. This quenching operation serves to "gel" the polymer dope composition, producing a strong, tough, solution-filled film. By controlling the composition of the coagulation bath, materials can be incorporated into the film microstructure.

In addition to causing the film microstructure to gel and become strong, the aqueous solution serves to hydrolyze the polyphosphoric acid to phosphoric acid, facilitating its removal from the film. The solution-filled film is then washed free of phosphoric acid.

When tube-blowing is employed, if the tube is not slit after coagulation but is merely collapsed flat for water-solution and drying treatments, it can then be re-blown and stretched biaxially in a tower- or tunnel-oven. The tube is slit into tape and roll-packaged just downstream of a central plug mandrel and guide rolls. Tube-blowing gas is advantageously introduced through the mandrel.

A common characteristic of laminates of the film materials is that they can be weak in the transverse direction (i.e., perpendicular to the plane of the laminated film). It is therefore desirable to increase the so-called trans-laminar strength of the films by using additional processing steps in the manufacture of the films, namely in the washing or solution processing of the coagulated film. Also, as will be discussed below, material may be added to increase the translaminer strength. The added material typical does not interfere with the rest of the processing steps, because the added material is not rendered strong and cohesive except by a subsequent processing step, e.g., heat treating or chemical conversion.

An important aspect of the method envisioned for increasing trans-laminar film strength is that the added material is not necessarily intended to be a major fraction of the final structural material or film; the added material can be a very minor constituent of the final structure and still provide substantial trans-laminar cohesivity or strength. In fact, since the rigid-rod ordered polymeric structure is relatively very compact, the added material most preferably is a very minor component, such that, the final overall material has the highest specific strength and stiffness properties, i.e., highest strength and stiffness per weight and volume. The amount of added material can be varied at will depending on the desired properties.

After the dope is extruded and coagulated, the resulting film structure is an interconnected network of highly oriented microfibrils which can be, for example, 80–100 Angstroms in diameter. In accordance with the present invention, the aqueous coagulant is replaced with one or more of a variety of materials, thereby forming a microcomposite. Those materials which are water compatible, such as cellulose derivatives, can be added directly to the aqueous coagulant. Those materials which are not water compatible are introduced after solvent exchange to a more compatible solvent system such as alcohol, alkane, etc. Examples of the latter materials include epoxides, polyphosphazenes, ceramic compositions based on colloidal silicates and other oxides or reaction products of metal with organic polymers such as polyacrylic acid.

The trans-laminar strength is thus improved by diffusing the added material as a precursor of a strong binder material into the PBT film during the washing stage of the process. This precursor can be an organometallic precursor of an inorganic glass, such as tetramethoxysilane; or an organically-modified glass precursor that has reactive organic groups incorporated therein, such as epoxides, more specifically an epoxy; or a precursor of a thermotropic plastic, such as caprolactam as a precursor for nylon, or polyamic acid as a precursor for polyimide.

Any infiltrate which is soluble or dispersible in a carrier inert to the PBT such that it can gain access to the internal microstructure of the film and which can be caused to polymerize or gel by chemical reaction or heat or light can be used as the added material in the present invention. For example, sol-gel processes for the formation of glasses and ceramics involves hydrolysis of low molecular weight monomeric precursors in solutions which react with water to form a coherent gel. The resulting gel can then be converted to a dense glass or crystalline ceramic by heating and/or by application of pressure. A number of borosilicate glass compositions are known to densify in the 400°–500° C. range which is well within the limits of PBT. Organic silicon alkoxides are also useful because they hydrolyze in the presence of water to produce rigid silicate glasses of high compressive strength and thermal stability. Among the silane reagents which can be use to infiltrate microfibrular PBT film are tetramethoxysilane, tetraethoxysilane, glycidyloxypropyltrimethoxysilane, methacryloxypropyltrimethoxysilane, methyltrimethoxysilane and dimethyldimethoxysilane. Polysulfones can also be employed.

As a binder material, glasses and polyimides are preferred over nylons, as the added material, because the former materials more nearly complement the high temperature and strength properties of the PBT film structure. A preferred polyimide precursor is a thermosetting acetylene-terminated polyimide available, for example, under the trade name Thermid IP-600. This a compound of the formula:

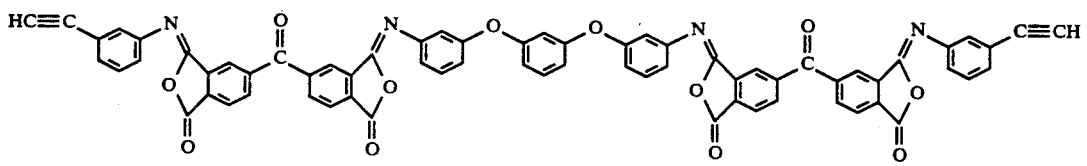

The concentration of the impregnant can be varied as desired. For example, it can range from about 1 to 25% by volume but is often preferably 1 to 10% by volume. The time, temperature and pressure used during the impregnation step can be varied as desired.

The impregnate can be introduced into the PBT film by several techniques. One is directed diffusion in which the reagent solutions are added to the water swollen films which allows the reagent to diffuse into the microporous interior, reacting with water and any traces of phosphoric acid present to form for example a sol-gel glass network throughout the film. An alternative process involves infiltration after solvent exchange. In this instance, the water in the water-swollen PBT film is exchanged with an appropriate solvent such as methanol or tetrahydrofuran, preferably in stages to prevent collapse of the swollen network. Thereafter, the methanol or THF swollen film is infiltrated with the sol-gel reagent solution and subsequently removed and placed into water to effect hydrolysis within the films or infiltrated with sol-gel reagents containing water, catalyst and reactive resin components. While the solvent exchange procedure is tedious and time consuming, it also provides greater control over sol-gel glass formation composition and allows infiltration of water insoluble or water deactivated reactive resins.

A preferred procedure for effecting solvent exchange involves the establishment of a series of containers in which the swollen film can be immersed (see FIG. 2). Each container is filled with either water, the exchange solvent or a combination of water in the exchange solvent. The film is immersed in the first container containing only water and after a period of imbibition transferred to the next container which contains 25% exchange solvent and 75% water, etc., until the film is immersed in the last container containing 100% exchange solvent. The film is then transferred to a solution of the penetrant material.

After the precursor has diffused into the washed but still swollen PBT film, e.g., via various sequential solvent exchanges, the film is dried and heat treated, causing a transformation of the added material to its final form as a strong trans-laminar binder material.

The film is preferably dried under controlled internal pressure, also known as a restrained drying process. This is accomplished by drying the film under a regulated air or nitrogen pressure of from about 5 to 10 psi, along with longitudinal loading and heating. The pressurized film tube may have, for example, about 1.5 to 3 inches diameter and a length of from about 5 to 12 inches. Drying under such conditions results in a highly oriented film of high strength characteristics. More specifically the polymers are ordered rod-like extended chain aromatic heterocyclic polymers. Drying in stages is also possible.

Applications of the high-strength, high-modulus, thermally-stable, chemically resistant, microporous PBT polymer films of the present invention include the following: (1) multi-layered, structural composites molded to complex shapes, (2) rigid, glass-containing composites, (3) filters of controlled porosity or use in harsh environments; (4) gas separation membranes; (5) water-purification membranes; (6) electronic circuit board structures; (7) lightweight space structures; (8) multi-layered, electrically conducting structural composites; (9) ionizing radiation-resistant composites; (10) low radar profile structures; (11) zero coefficient of expansion structural composites; (12) porous substrates for controlled release of volatile materials in harsh environments; (13) leaf springs, helical springs and (14) capacitors.

The method of the present invention will be further illustrated with reference to the following examples which are intended to aid in the understanding of the present invention, but which are not to be construed as a limitation thereof. All percentages reported herein, unless otherwise specified, are percent by weight. All temperatures are expressed in degrees Celsius and are uncorrected.

A PBT/PBA dope was homogenized and degassed and then passed through an extruder where shear was imparted to the dope. The dope was then blown using conventional film blowing equipment. The resulting blown tube entered a coagulation (water) tank. The blown film was then repeatedly washed with water to remove acid solvent from the film, placed in a restraint and dried by applying an internal pressure of 5-9 psi of the wet tube.

The foregoing procedure was repeated except that after the coagulation step, a resin infiltration was effected. The water in the water swollen PBT film was exchanged stepwise with methyl ethyl ketone followed by immersion of the film in an epoxy resin solution in methyl ethyl ketone following the procedure illustrated in FIG. 2. The infiltrated film thus prepared was oven dried at 100° C. to convert the epoxy to the B-stage prior to use. Lap-shear specimens were tested using a United Test Machine with a crosshead speed of 0.050 inch per minute. The PBT film control showed a lap-shear strength of 496 psi while the epoxy infiltrated PBT film had a strength of 524 psi. Inspection showed that cohesive delamination from within the PBT film had been arrested by the resin infiltration. Laminates were extremely difficult to peel into discrete layers compared to non-infiltrated film laminates which readily separated.

The foregoing PBT procedure was repeated except that the water was stepwise replaced with tetrahydrofuran followed by subsequent infiltration of the PBT blown film tube with a 25% solution of Thermid IP-600 polyimide precursor resin in tetrahydrofuran. Five exchange containers were used containing, in sequence, 25% THF/water, 50% THF/water, 75% THF/water, 100% THF and 25% resin solution in THF. The swollen PBT film was placed in each container for eight hours before being transferred to the next container. The ends of the impregnated tube was placed under restraint and pressurized air introduced into the interior of the tube. The resulting smooth surface tubes were recoated with the Thermid solution by dipping, to insure adequate resin pickup on the film surface, reassembled in the pressurized restraint apparatus and air dried again. The smooth surface, resin coated/infiltrated tubes of the PBT film were slit and exposed to 400° F. for several minutes to remove traces of solvent and partially advance the polyimide resin to the B-stage.

Laminates were prepared by alternating polyetheretherketone (peek) resin film and PBT film, with or without polyimide impregnation, and applying heat and pressure thereto. A thermoplastic adhesive had been applied between the plies. Visually, the infiltrated PBT film laminates appeared much better than the non-infiltrated film laminates in their resistance to delamination from within the film layers. The properties of the laminates were measured:

|  | Interpenetrated | Non-Interpenetrated |
| --- | --- | --- |
| Short Beam Shear Strength | 1700 psi | 450 psi |
| Flexural Strength |  |  |
| Modulus (ASTM D790) | 35 ksi | 15 ksi |
| Tensile Strength | 3.0 Msi | 3.2 Msi |
| Modulus | 28 ksi | |
| | 3 Msi | |

Various changes and modifications, can be made in the process and products of the present invention without departing from the spirit and scope thereof. The various embodiments which have been disclosed herein were for the purpose of further illustrating the invention but were not intended to limit it.

What is claimed is:

1. A polymer fiber comprising an ordered rod-like extended chain aromatic heterocyclic polymer having a binder selected from the group consisting of glass, ceramic, polysulfone, epoxy and polyimide interpenetrated in the microinfrastructure prepared by treating by shear a dope containing an ordered polymer to produce a microscale structure orientation therein, solidifying said microscale structure by coagulation in an aqueous medium, penetrating a binder precursor into the microstructure of said solidified polymer, and converting said precursor to said binder.

2. A polymer fiber comprising an ordered rod-like extended chain aromatic heterocyclic polymer selected from the group consisting of poly(para-phenylenebenzo bisthiazole) and poly(para-phenylenebenzo bisoxazole), and a glass binder infiltrated within the polymer to form a microcomposite of the polymer and the binder.

3. A polymer fiber comprising an ordered rod-like extended chain aromatic heterocyclic polymer selected from the group consisting of poly(p-phenylenebenzo bisthiazole) and poly(p-phenylenebenzo bisoxazole) having a binder selected from the group consisting of glass, ceramic, polysulfone, epoxy and polyimide interpenetrated in the microinfrastructure.

4. The fiber of claim 1, wherein said binder is a thermoset acetylene-terminated polyimide.

* * * * *